US011113737B2

(12) United States Patent
Moeller et al.

(10) Patent No.: US 11,113,737 B2
(45) Date of Patent: Sep. 7, 2021

(54) METHOD AND SYSTEM FOR MANAGING CONSTRAINT-BASED VIOLATIONS IN A PRODUCT DATA MANAGEMENT ENVIRONMENT

(71) Applicant: Siemens Industry Software Inc., Plano, TX (US)

(72) Inventors: Thomas F. Moeller, Weilerswist (DE); Jinendra Bansilal Akkarbote, Maharashtra (IN); Santosh Kumar Singh, Maharashtra (IN)

(73) Assignee: SIEMENS INDUSTRY SOFTWARE INC., Plano, TX (US)

( * ) Notice: Subject to any disclaimer, the term of this patent is extended or adjusted under 35 U.S.C. 154(b) by 511 days.

(21) Appl. No.: 15/265,957

(22) Filed: Sep. 15, 2016

(65) Prior Publication Data

US 2017/0337603 A1 Nov. 23, 2017

(30) Foreign Application Priority Data

May 17, 2016 (IN) .............................. 201631016956

(51) Int. Cl.
G06Q 30/00 (2012.01)
G06Q 30/06 (2012.01)
G06Q 10/08 (2012.01)

(52) U.S. Cl.
CPC ....... G06Q 30/0609 (2013.01); G06Q 10/087 (2013.01); G06Q 30/0621 (2013.01)

(58) Field of Classification Search
CPC ........... G06Q 30/0609; G06Q 30/0621; G06Q 10/087
See application file for complete search history.

(56) References Cited

U.S. PATENT DOCUMENTS 7,263,515 B1 * 8/2007 Tenorio ................. G06Q 30/02
7,475,030 B1 * 1/2009 Tenorio ............. G06Q 30/0603
705/26.62

(Continued)

FOREIGN PATENT DOCUMENTS

WO WO2008005568 A2 1/2008

OTHER PUBLICATIONS

J. Bailey and P. J. Stuckey. "Discovery of minimal unsatisfiable subsets of constraints using hitting set dualization," 3ractical Aspects of Declarative Languages, pp. 174-186 (Year: 2005).*

(Continued)

Primary Examiner — Matthew E Zimmerman
(74) Attorney, Agent, or Firm — Lempia Summerfield Katz LLC

(57) ABSTRACT

Managing of constraint-based violations in a Product Data Management (PDM) environment is provided. A method for managing constraint-based violations associated with a product in a PDM system includes obtaining a set of constraints defined for a product from a product database. Constraints that are conflicting with requirement data associated with the product are determined from the set of constraints, and the constraints are grouped into a plurality of logical groups. Each of the logical groups is associated with an independent violation. One or more solutions corresponding to each independent violation are computed based on the logical groups, and conflicts between the constraints and the requirement data corresponding to each independent violation based on the corresponding one or more solutions are resolved.

13 Claims, 14 Drawing Sheets

(56) References Cited

U.S. PATENT DOCUMENTS

| | | | |
|---|---|---|---|
| 8,355,954 B1 * | 1/2013 | Goldberg | G06Q 30/0601 |
| | | | 705/26.1 |
| 10,585,926 B2 * | 3/2020 | Bullis | G06F 16/3323 |
| 2006/0015411 A1 * | 1/2006 | Mela | G06Q 10/06 |
| | | | 703/13 |
| 2012/0054678 A1 * | 3/2012 | Haag | G06Q 30/0621 |
| | | | 715/810 |
| 2013/0145274 A1 * | 6/2013 | Jacob Sushil | G06Q 30/0621 |
| | | | 715/735 |
| 2013/0246480 A1 | 9/2013 | Lemcke et al. | |
| 2014/0088925 A1 | 3/2014 | Owen | |

OTHER PUBLICATIONS

Felfernig, A, et al. , "An efficient diagnosis algorithm for inconsistent constraint sets", Artificial intelligence forengineering design analysis and manufacturing, Jan. 2012.

J. Bailey and P. J. Stuckey. "Discovery of minimal unsatisfiable subsets of constraints using hitting set dualization," Practical Aspects of Declarative Languages, pp. 174-186, 2005.

Malitsky, Yuri, et. al., "A portfolio Approach to enumerating Minimal Correction Subsets for SatisfiabilityProblems", in Integration of AI and OR Techniques in Constraints Programming , 11th International Conference,CPAIOR 2014, Cork, Ireland, May 2014.

European Search Report for European Application No. 17168123. 2-1958, dated Sep. 19, 2017.

* cited by examiner

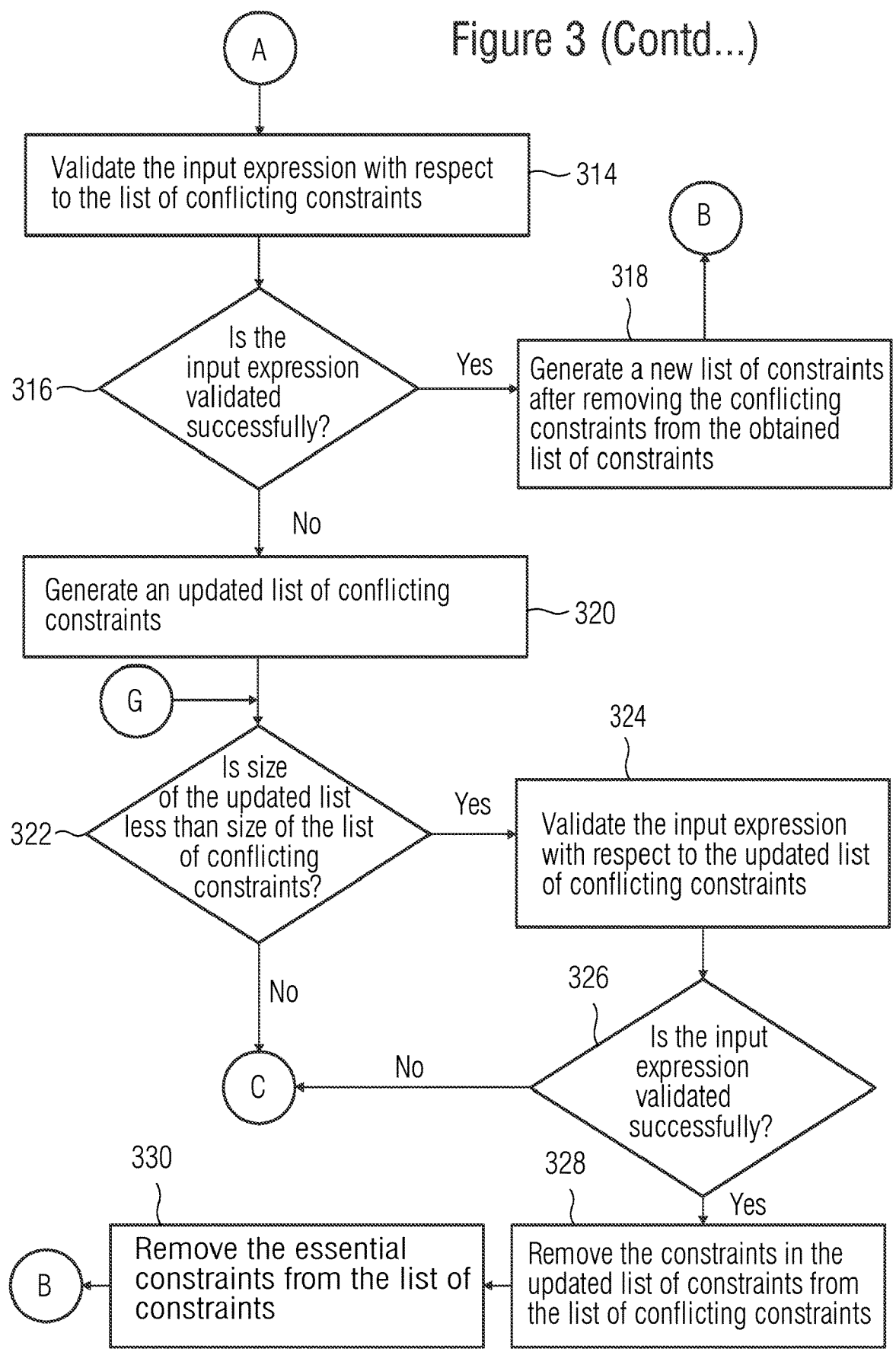
Figure 3 (Contd...)

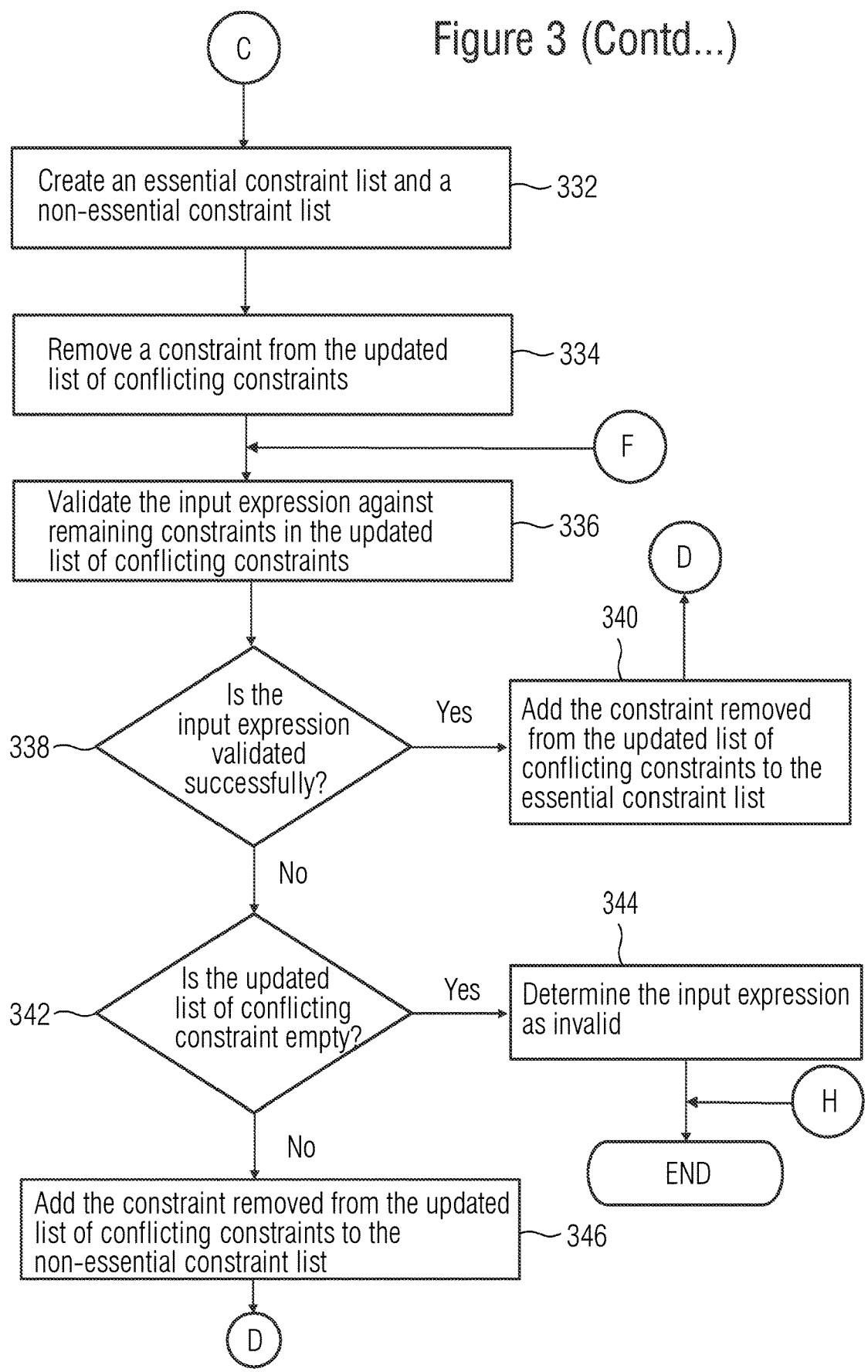

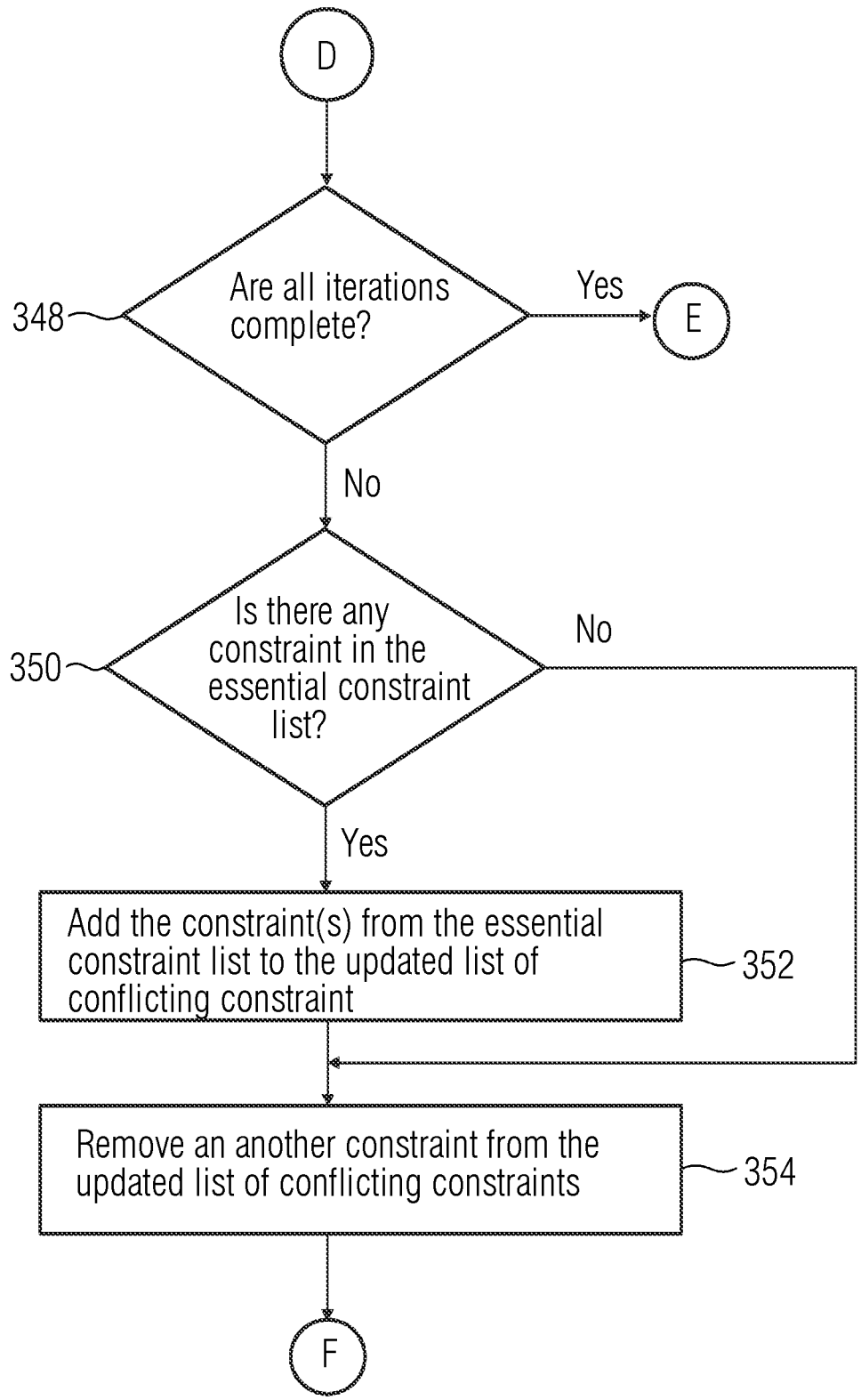
Figure 3 (Contd...)

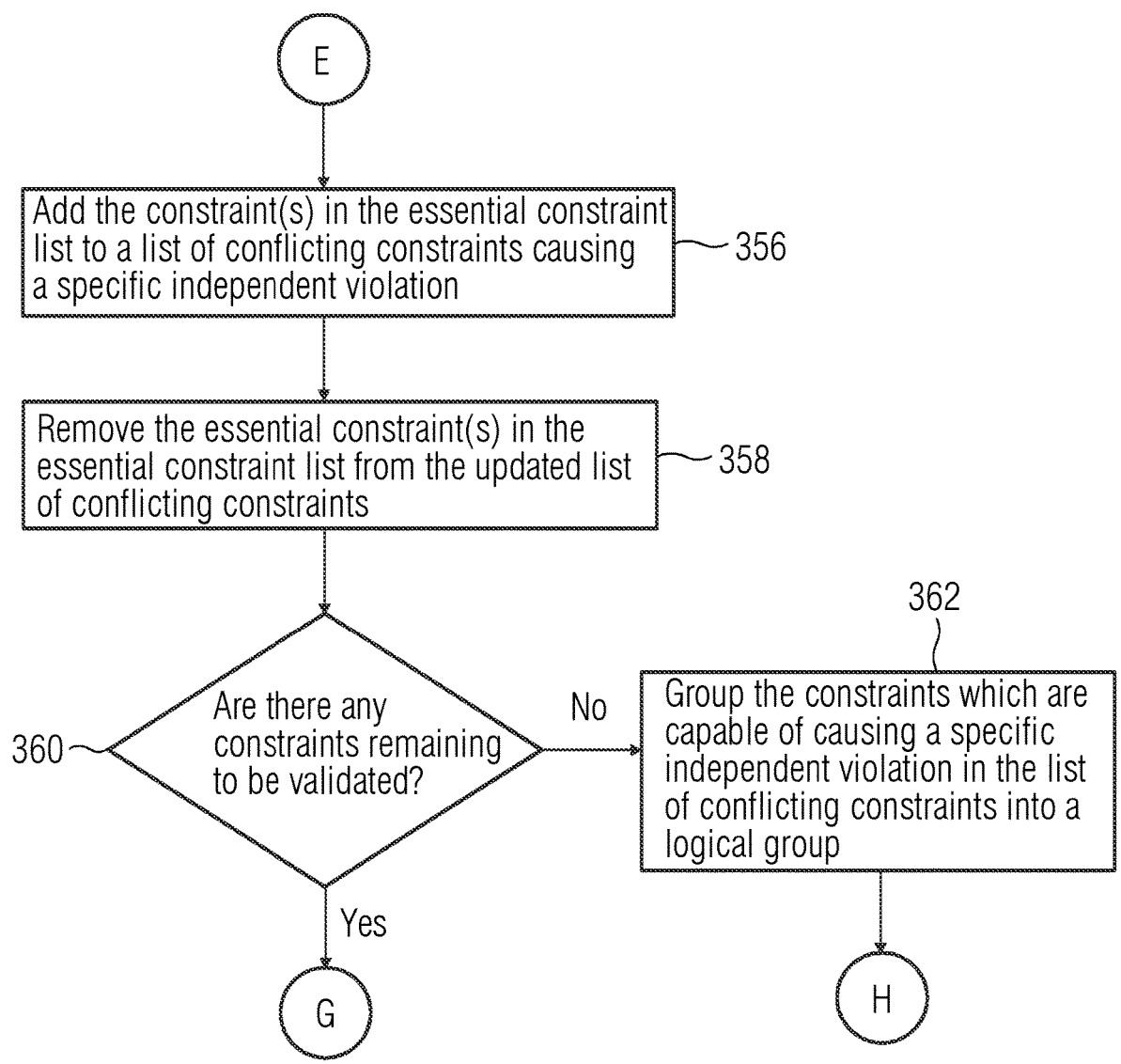

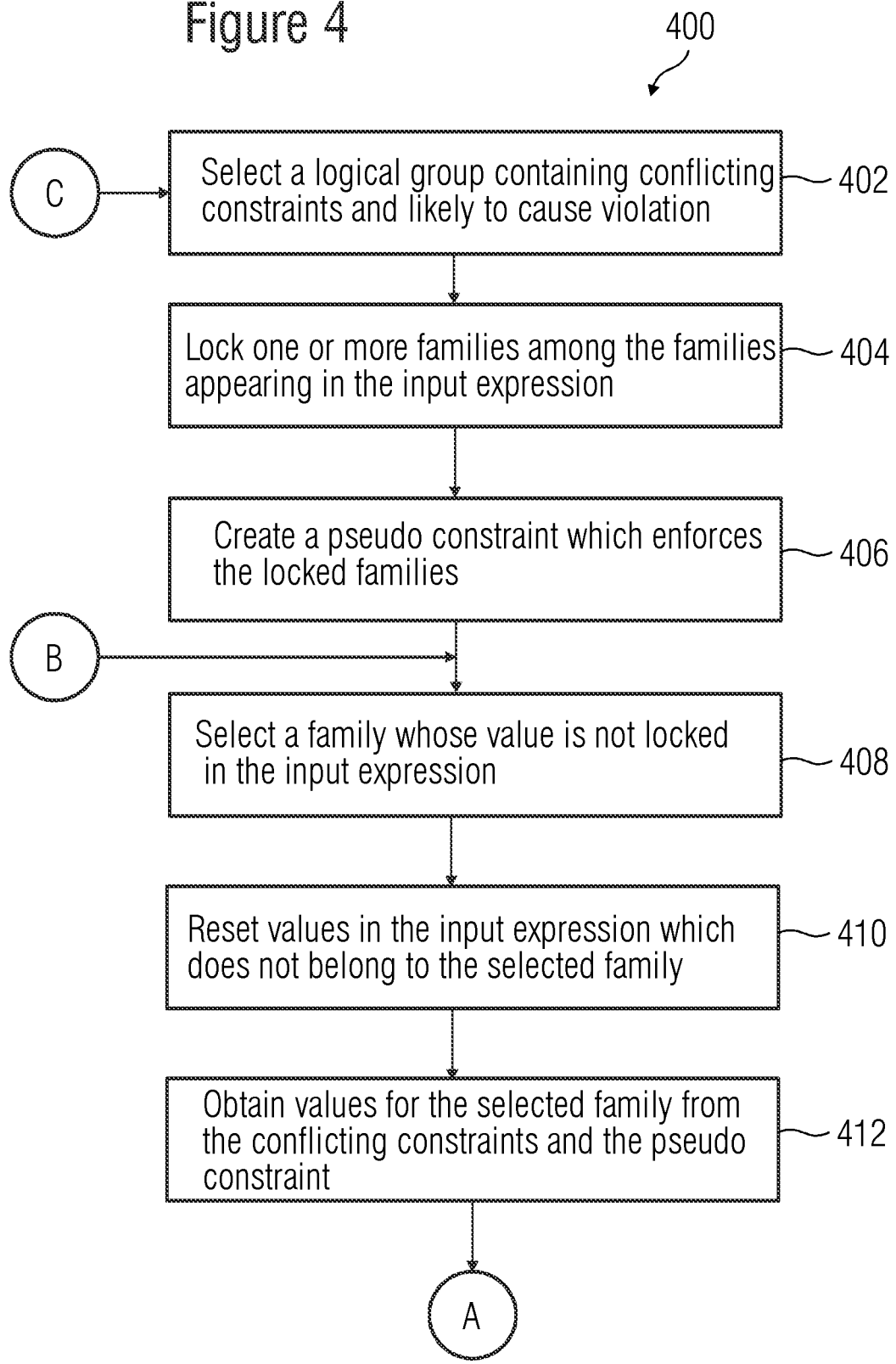

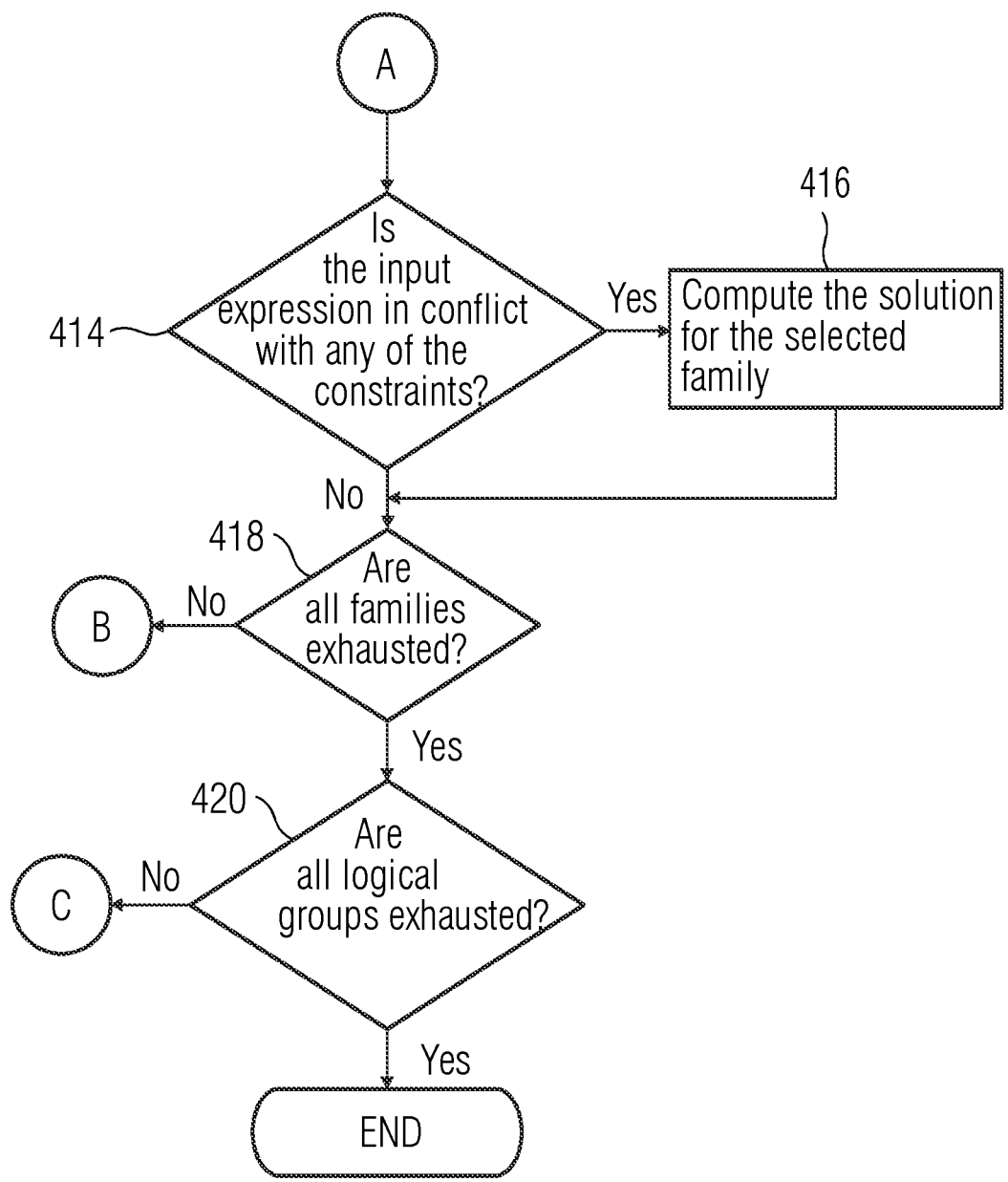

METHOD AND SYSTEM FOR MANAGING CONSTRAINT-BASED VIOLATIONS IN A PRODUCT DATA MANAGEMENT ENVIRONMENT

PRIORITY CLAIM

This application claims the benefit of the Indian Provisional Application no. 201631016956 titled "METHOD AND SYSTEM FOR CONFIGURING A PRODUCT" filed on May 17, 2016, which is hereby incorporated by reference in its entirety.

FIELD OF TECHNOLOGY

The present disclosure generally relates to the field of Product Data Management (PDM), and more particularly to managing constraint-based violations in a product data management environment.

BACKGROUND

Product Data Management (PDM) is a function within a Product Lifecycle Management (PLM) responsible for management and publication of product data. A PDM system is a software product for managing product data and process-related data in a single central system. This data includes computer-aided design (CAD) data, models, parts information, manufacturing instructions, requirements, notes and documents. The PDM system provides solutions for secure data management, process enablement and configuration management.

Typically in the PDM system, a product is configured based on requirement data provided by a user. The product referred herein may be a CAD model of a real-world object such as a car or components of the car. The set of constraints are also known as 'set of rules' or 'set of assertions'. For example, a set of constraints for a car may include values corresponding to wheel diameter, trim type, transmission type, etc.

A user may provide requirement data associated with the product in the form of input expression via a graphical user interface of the PDM system. In such case, the PDM system may validate the requirement data against a set of constraints predefined for the product. One or more constraints in the set of constraints may be in conflict with the requirement data. In other words, the requirement data may not match with the one or more constraints predefined for the product. This may lead to one or more violations related to the product.

Currently known PDM systems output a single dimensional representation if validation of the set of constraints against the requirement data is unsuccessful (e.g., the set of constraints are in conflict with the requirement data). The single dimensional representation may include a notification indicating that the set of constraints is in conflict with the requirement data. However, the single dimensional representation may not give an idea to the user regarding number of independent violations caused due to conflicting constraints, and which of the constraint(s) in the set of constraints are responsible for each of the independent violations. Therefore, it may be cumbersome and time consuming for the user to determine the constraints that are capable of causing the independent violations by screening through large number of constraints. Also, there is a possibility that the constraints that are determined as conflicting with the requirement data may contain erroneous constraints (e.g., the constraints that are not responsible for violations).

SUMMARY

A method and system for managing constraint-based violations in a Product Data Management (PDM) environment is disclosed. In one aspect, a method for managing constraint-based violations associated with a product in a PDM system includes obtaining a set of constraints defined for the product from a product database. The method also includes determining constraints from the set of constraints that are conflicting with requirement data associated with the product, and grouping the constraints into a plurality of logical groups. Each of the logical groups is associated with an independent violation.

The method may also include outputting a multi-dimensional representation of violations on a graphical user interface of the PDM system. The method may also include computing one or more solutions corresponding to each independent violation based on the logical groups, and automatically resolving conflicts between the constraints and the requirement data corresponding to each independent violation based on the one or more solutions.

In another aspect, a PDM system includes a processor, and an accessible memory coupled to the processor. The memory includes a PDM module configured for obtaining a set of constraints defined for a product, determining constraints from the set of constraints that are conflicting with requirement data associated with the product, and grouping the constraints into a plurality of logical groups. Each of the logical groups is associated with an independent violation. The PDM module may be configured for outputting a multi-dimensional representation of violations on a display unit.

Additionally, the PDM module may be configured for computing one or more solutions corresponding to each independent violation based on the logical groups, and automatically resolving conflicts between the constraints and requirement data corresponding to each independent violation based on the one or more solutions.

In yet another aspect, a non-transitory computer-readable storage medium having instructions stored therein, which when executed by a PDM system, cause the PDM system to perform a method for managing constraint-based violations associated with a product, is provided. The method includes obtaining a set of constraints defined for the product from a product database, determining constraints from the set of constraints that are conflicting with requirement data associated with the product, and grouping the constraints into a plurality of logical groups. Each of the logical groups is associated with an independent violation.

The method act may include outputting a multi-dimensional representation of violations on a graphical user interface of the PDM system. Additionally, the method acts may include computing one or more solutions corresponding to each independent violation based on the logical groups, and automatically resolving each independent violation based on the one or more solutions.

This summary is provided to introduce a selection of concepts in a simplified form that are further described below in the following description. The summary is not intended to identify features or essential features of the claimed subject matter. The claimed subject matter is not limited to implementations that solve any or all disadvantages noted in any part of this disclosure.

BRIEF DESCRIPTION OF THE VIEWS OF THE DRAWINGS

A more complete appreciation of the present disclosure and many of the attendant aspects thereof will be readily obtained as the same becomes better understood by reference to the following description when considered in connection with the accompanying drawings:

FIG. 4 is a process flowchart illustrating an exemplary method of computing solutions to resolve conflicts between the constraints and the requirement data associated with the product, according to an embodiment;

DETAILED DESCRIPTION

Figure 1:
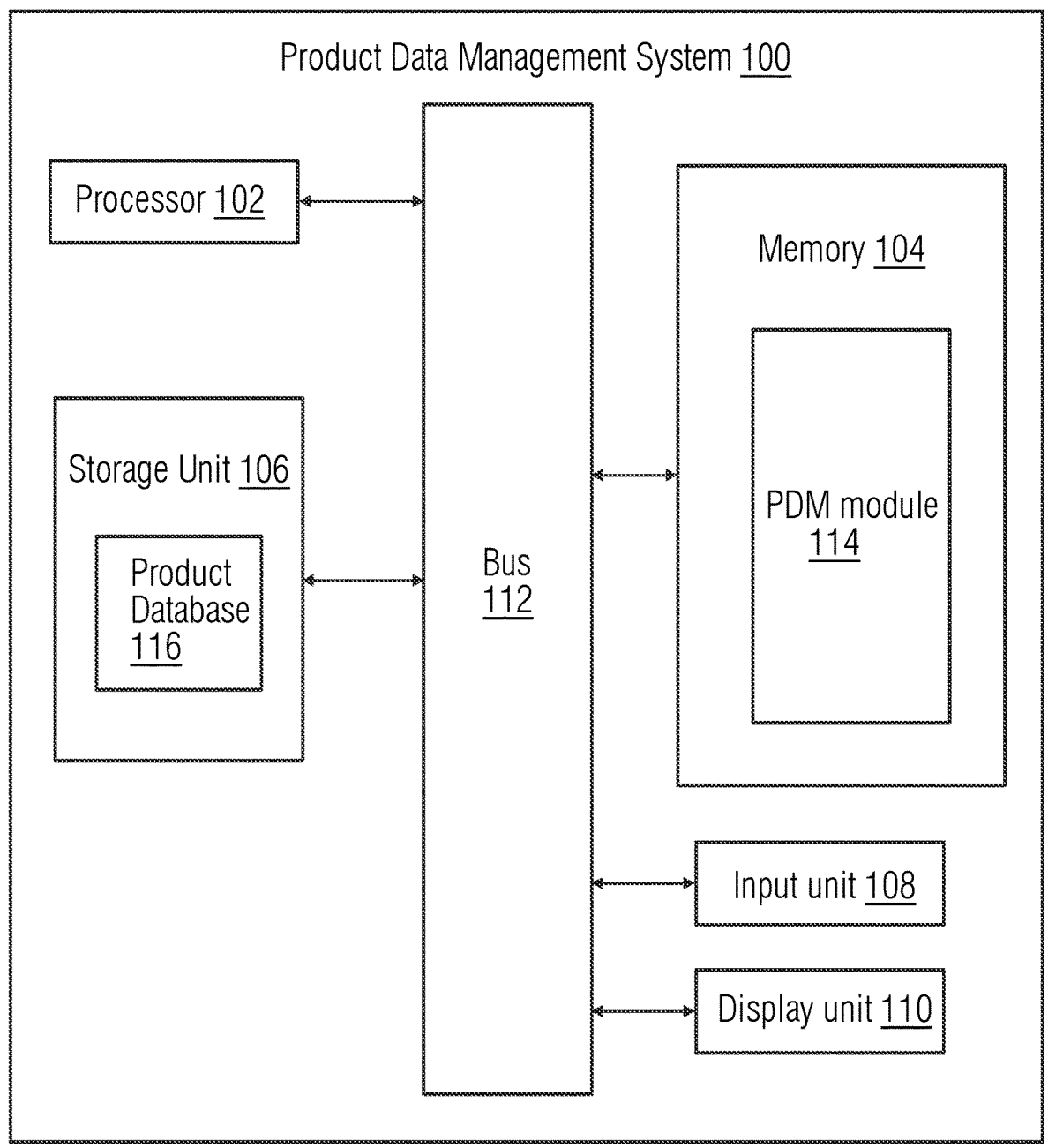
FIG. 1 illustrates a block diagram of a Product Data Management (PDM) system in which an embodiment may be implemented.

A method and system for managing constraint-based violations in a Product Data Management (PDM) environment is disclosed. Various embodiments are described with reference to the drawings, where like reference numerals are used to refer to like elements throughout. In the following description, numerous specific details are set forth in order to provide thorough understanding of embodiments of the present disclosure. It will be apparent to one skilled in the art, that these specific details need not be employed to practice embodiments of the present disclosure. In other instances, well known materials or methods have not been described in detail in order to avoid unnecessarily obscuring embodiments of the present disclosure. While the disclosure is susceptible to various modifications and alternative forms, specific embodiments thereof are shown by way of example in the drawings and will herein be described in detail. It should be understood, however, that there is no intent to limit the disclosure to the particular forms disclosed; on the contrary, the disclosure is to cover all modifications, equivalents, and alternatives falling within the spirit and scope of the present disclosure.

FIG. 1 illustrates a block diagram of a Product Data Management (PDM) system 100 in which an embodiment may be implemented, for example, as a data processing system particularly configured by software or otherwise to perform the processes as described herein. The PDM system 100 may be a personal computer, a laptop computer, a tablet, and the like. In FIG. 1, the PDM system 100 includes a processor 102, an accessible memory 104, a storage unit 106, an input unit 108, a display unit 110, and a bus 112.

The processor 102, as used herein, may be any type of computational circuit, such as, but not limited to, a microprocessor, microcontroller, complex instruction set computing microprocessor, reduced instruction set computing microprocessor, very long instruction word microprocessor, explicitly parallel instruction computing microprocessor, graphics processor, digital signal processor, or any other type of processing circuit. The processor 102 may also include embedded controllers, such as generic or programmable logic devices or arrays, application specific integrated circuits, single-chip computers, and the like.

The memory 104 may be volatile memory and non-volatile memory. The memory 104 may be coupled for communication with the processor 102. The processor 102 may execute instructions and/or code stored in the memory 104. A variety of computer-readable storage media that may be stored in and accessed from the memory 104. The memory 104 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 104 includes a PDM module 114 stored in the form of machine-readable instructions on any of the above-mentioned storage media and may be in communication with and executed by the processor 102. When executed by the processor 102, the PDM module 114 causes the processor 102 to group constraints of a product that are in conflict with requirement data into a plurality of logical groups corresponding to independent violations, and automatically resolve conflicts between the constraints and the requirement data corresponding to the independent violations. Method acts performed by the processor 102 to achieve the above functionality are described in greater detail in FIG. 2.

The storage unit 106 may be a non-transitory storage medium that stores a product database 116. The product database 116 stores a set of constraints pre-defined for a product. The product database 116 also stores information of the product (e.g., geometric model information). The input unit 108 may include an input device such as keypad, touch-sensitive display, camera (e.g., a camera receiving gesture-based inputs), etc. capable of receiving an input signal such as a file including requirement data associated with the product. The display unit 110 may be a device for displaying a graphical user interface that visualizes a multi-dimensional representation of violations. The bus 112 acts as an interconnect between the processor 102, the memory 104, the storage unit 106, the input unit 108, and the output unit 110.

Those of ordinary skilled in the art will appreciate that the hardware depicted in FIG. 1 may vary for particular implementations. For example, other peripheral devices such as an optical disk drive and the like, Local Area Network (LAN)/Wide Area Network (WAN)/Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

A PDM system in accordance with an embodiment of the present disclosure includes an operating system employing a graphical user interface. The operating system permits multiple display windows to be presented in the graphical user interface simultaneously with each display window providing an interface to a different application or to a different instance of the same application. A cursor in the graphical user interface may be manipulated by a user through the pointing device. The position of the cursor may be changed, and/or an event such as clicking a mouse button may be generated to actuate a desired response.

One of various commercial operating systems, such as a version of Microsoft Windows™, a product of Microsoft Corporation located in Redmond, Wash., may be employed if suitably modified. The operating system is modified or created in accordance with the present disclosure as described.

Disclosed embodiments provide systems and methods that manage constraint-based violations caused due to conflict between constraints in a set of constraints defined for a product and requirement data specified for the product by the user. For example, disclosed techniques may group constraints that are in conflict with requirement data into logical groups corresponding to violations, and automatically resolve the conflicts between the constraints and the requirement data to avoid violations based on one or more solutions.

Figure 2:
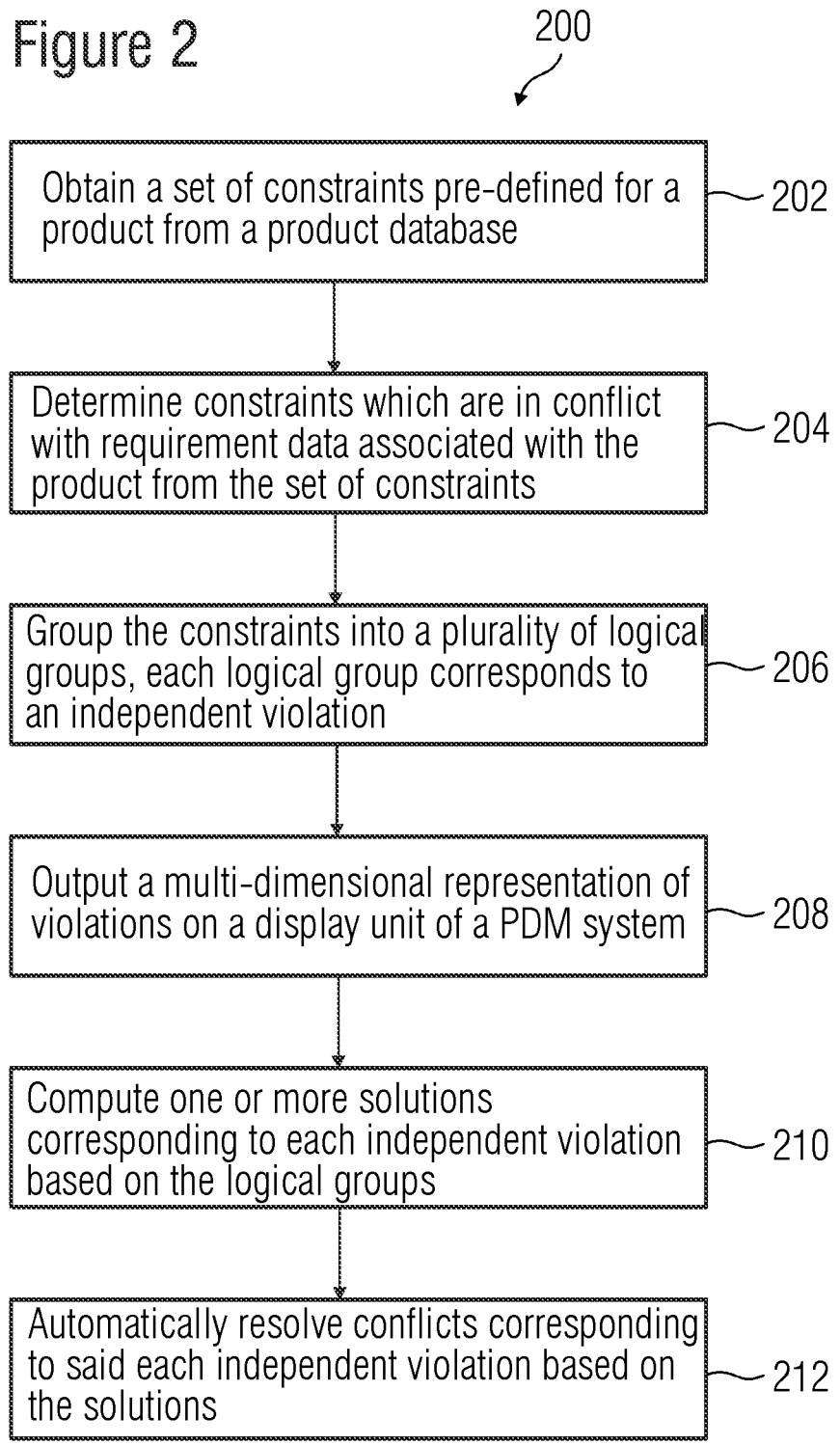
FIG. 2 is a process flowchart illustrating a method of managing constraint-based violations associated with a product in the PDM system, according to an embodiment.

FIG. 2 is a process flowchart 200 illustrating an exemplary method of managing constraint-based violations associated with a product in the PDM system 100, according to an embodiment. At act 202, a set of constraints defined for the product is obtained from a product database. For example, a set of constraints defined for a car of specific model M1 may include: Model M1 implies trim type performance, trim type performance implies manual transmission, manual transmission implies 20 inches wheel. The set of constraints are obtained in response to requirement data entered by a user in the PDM system 100 for the product. At act 204, constraints that are in conflict from requirement data associated with the product are determined from the set of constraints. For example, the requirement data entered by the user is validated against the obtained set of constraints. The requirement data is the form of an input expression that indicates requirement of the user with respect to the product. The input expression contains multiple Boolean statements containing values associated with one or more families. The values indicate user preferences for configuring the product. The requirement data may match with the set of constraints or be in conflict with one or more constraints in the set of constraints. To identify whether the requirement data matches with the set of constraints, the requirement data is validated against the set of constraints. It is determined whether the requirement data is successfully validated with respect to the set of constraints. If the requirement data is successfully validated, the product may be configured based on the requirement data. If the requirement data is not successfully validated, one or more constraints from the set of constraints that are in conflict from the requirement data are identified. Each of the one or more constraints may cause a specific independent violation. The acts involved in identifying conflicting constraints capable of causing independent violations are described in greater detail in description of FIG. 3 below.

At act 206, the constraints are grouped into a plurality of logical groups. For example, each logical group corresponds to a specific independent violation. Each logical group may include one or more constraints capable of causing the specific independent violation. In an exemplary embodiment, different independent violations are determined based on the identified constraints. Based on the different independent violations, the constraints capable of causing the specific independent violations are grouped into the plurality of logical groups. The constraints responsible for the specific independent violations are automatically grouped into the respective logical groups so that conflicts between of the constraint(s) in each logical group and the requirement data may be easily identified and resolved. It may be noted that each logical group is independent of other logical groups and is responsible for independent violation. The logical groups do not contain constraints that are capable of causing false positive violations or omit constraints capable of causing true violations. In other words, the logical groups contain constraints that may cause true violations.

At act 208, a multi-dimensional representation of violations is outputted on the display unit 110 of the PDM system 100. For example, the multi-dimensional representation of violations may include a total number of logical groups capable of causing different independent violations, and constraints belonging to each of the logical groups. The multi-dimensional representation of violations enables the user to visualize and understand different independent violations in conjunction with constraints responsible for each independent violation.

At act 210, one or more solutions corresponding to each independent violation are computed based on the logical groups corresponding to the different independent violations. The solutions are computed such that the conflicts between the constraints and the requirement data may be resolved. In one embodiment, a solution may suggest modifying a value of a conflicting constraint belonging to one of the logical groups to resolve conflict and avoid the violation. In another embodiment, the solution may suggest modifying the requirement data corresponding to a conflicting constraint belonging to one of the logical groups to resolve conflict and avoid the violation. At act 212, conflicts between the constraints and the requirement data corresponding to each independent violation is automatically resolved based on the one or more solutions. For example, the value of the conflicting constraint is changed, or the values in the input expression are modified to resolve the conflict based on the solution computed by the PDM system 100. The requirement data is made consistent with the set of constraints. Once the conflicts between the set of constraints and the requirement data are resolved, the user may proceed with configuring the product. In such case, the product is configured based on the requirement data. Since the requirement data is consistent with the set of constraints, quality of the configured product is enhanced.

For example, consider that a vehicle model M1 is to be configured by the PDM system 100. Also, consider that the following set of constraints are pre-defined for the vehicle model M1:
Constraint 1: Model M1 implies Trimtype=Performance
Constraint 2: Trimtype=Performance implies Transmission=Manual
Constraint 3: Transmission=Manual implies Wheel=20 inches
Constraint 4: Transmission=Manual implies ABS=True Consider that a user wishes to configure the model M1 with automatic transmission without ABS and a wheel diameter of 18 inches. In such a case, the requirement data would be ABS=False, Transmission=Automatic, and Wheel=18 inches for the model M1. According to the present disclosure, the PDM system 100 obtains the set of constraints for the vehicle model M1 from the product database and validates the set of constraints with respect to the requirement data. The PDM system 100 identifies that the constraint 3 and the constraint 4 is not consistent with the requirement data, as the constraint 3 mentions Wheel=20 inches for manual transmission, and the constraint 4 mentions ABS=True for manual transmission. The PDM system 100 also determines that the constraint 3 is capable of causing a different violation compared to the constraint 4. Hence, the PDM system 100 groups the constraint 3 into a logical group 1. Similarly, the PDM system 100 groups the constraint 4 into a logical group 2. The logical group 1 is independent of the logical group 2 since the logical group 1 is capable of causing a violation related to wheel size, while the logical group 2 is capable of causing a violation related to ABS.

The PDM system 100 outputs the two dimensional representation on a graphical user interface as shown below:
Logical Group 1:
Constraint 3: Transmission=Manual implies Wheel=20 inches
Logical Group 2:
Constraint 4: Transmission=Manual implies ABS=True
Based on the above two-dimensional representation, the user gets to know that there are two independent violations, one is wheel diameter and the other is ABS.

Additionally, the PDM system 100 may compute solutions corresponding to the independent violations and may automatically resolve the conflicts between the constraints and the requirement data that are capable of causing violations. In other words, the PDM system 100 may request the user to change the requirement data, as the standard norm for vehicle model M1 with manual transmission is 20 inches wheel and ABS present. Alternatively, the PDM system 100 may change the constraint 3 and 4 according to the requirement data to resolve the conflicts between the constraints and the requirement data capable of causing violations. In this manner, the set of constraints are evaluated and conflicting constraints responsible for independent violations are reported in the form of independent logical groups. Additionally, the conflicts between the constraints in each logical group and the requirement data are resolved based on solutions computed by the PDM system 100.

Figure 3:
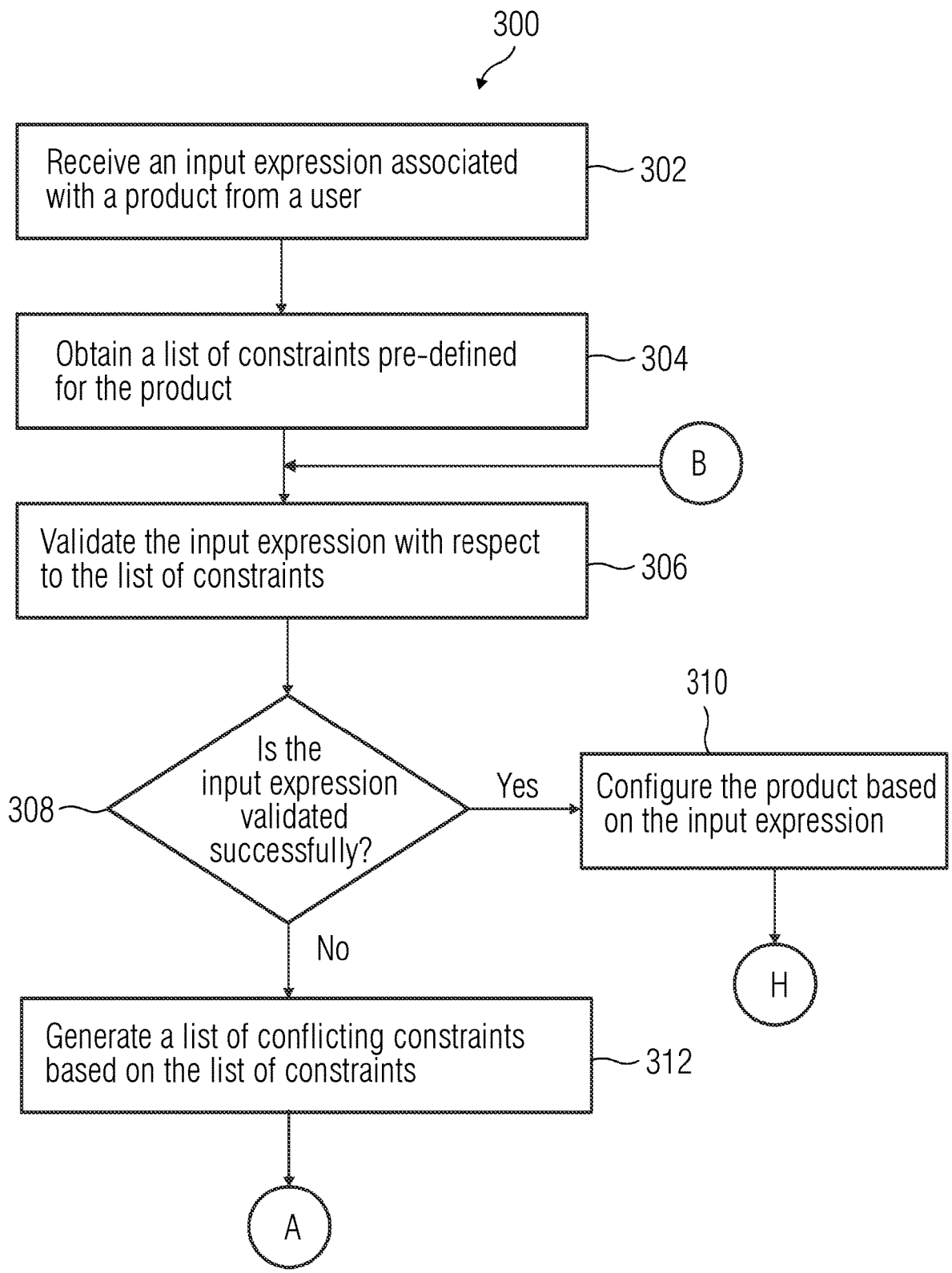
FIG. 3 is a process flowchart illustrating an exemplary method of generating logical groups of constraints that are in conflict with requirement data associated with the product, according to an embodiment.

FIG. 3 is a process flowchart 300 illustrating an exemplary method of generating logical groups of constraints that are in conflict with requirement data associated with the product, according to an embodiment. At act 302, an input expression associated with a product is received from a user via a graphical user interface of the PDM system 100. The input expression may include requirement data associated with the product. At act 304, a list of constraints predefined for the product is obtained from the product database 116.

At act 306, the input expression is validated with respect to the list of constraints. At act 308, it is determined whether the input expression is successfully validated against the list of constraints. If the input expression is successfully validated, then the product is configured using the input expression at act 310, and the process ends. If the input expression is not validated successfully, then at act 312, a list of conflicting constraints is generated based on the list of constraints pre-defined for the product. The list of conflicting constraints includes constraints that are in conflict with the input expression and capable of causing violations.

At act 314, the input expression is validated with respect to the list of conflicting constraints. At act 316, it is determined whether the input expression is successfully validated against the list of conflicting constraints. If the input expression is successfully validated, it implies that constraints in the list of conflicting constraints are false positive. Hence, at act 318, a new list of constraints is generated after removing the conflicting constraints from the obtained list of constraints, and the act 306 is performed based on the new list of constraints.

If the input expression is not successfully validated, then at act 320, an updated list of conflicting constraints is generated. At act 322, it is determined whether size of the updated list of conflicting constraints is less than the size of the list of conflicting constraints. If the size of the updated list of conflicting constraints is less than size of the list of conflicting constraints, then at act 324, the input expression is validated with respect to the updated list of conflicting constraints. At act 326, it is determined whether the input expression is validated successfully. If the input expression is validated successfully, then it implies that the constraints in the updated list of conflicting constraints are false positive. Hence, at act 328, the constraints in the updated list of conflicting constraints are removed from the list of conflicting constraints, and the act 306 is performed. If the validation is not successful, then act 332 is performed.

If size of the updated list of conflicting constraints is equal to or greater than the list of conflicting constraints, then at act 332, an essential constraint list and a non-essential constraint list are created. It may be noted that the essential constraint list and the non-essential constraint list are empty lists. The essential constraint list is created to contain constraints that result in unsuccessful validation of the input expression (e.g., the constraint is essentially conflicting with the input expression). If the input expression is validated against constraints that do not include essential constraint(s), the validation of the input expression may be successful. The non-essential constraint list is created to contain constraints that do affect the validation result of the input expression.

At act 334, a constraint is removed from the updated list of conflicting constraints. For example, the removed constraint is a first constraint in the updated list of conflicting constraints. At act 336, the input expression is validated against remaining constraints in the updated list of conflicting constraints. At act 338, it is determined whether the input expression is successfully validated against the remaining constraints in the updated list of conflicting constraints. If the input expression is successfully validated, then at act 340, the constraint removed from the updated list of conflicting constraints is added to the essential constraint list, and act 348 is performed. If the input expression is not validated successfully, then at act 342, it is determined whether the updated list of conflicting constraint is empty. If the updated list of conflicting constraint is empty, then at act 344, the input expression is determined as invalid, and then, the process is terminated. Otherwise, at act 346, the constraint removed from the updated list of conflicting constraints is added to the non-essential constraint list, and act 348 is performed.

At act 348, it is determined whether iterations are complete for identifying one or more constraints capable of causing a specific independent violation. The iterations are complete if the input expression is validated at act 336 by skipping each of the constraints in the updated list of constraints. If the iterations are not complete, then at act 350, it is determined whether there is any constraint in the essential constraint list. If there is constraint(s) in the essential constraint list, then at act 352, the constraint(s) from the essential constraint list is added to the updated list of conflicting constraints, and act 354 is performed. If the essential constraint list is empty, then act 354 is performed. At act 354, another constraint is removed from the updated list of conflicting constraints, and act 336 is performed.

If, at act 348, it is determined that the iterations are complete, then at act 356, essential constraint(s) in the essential constraint list is added to a list of conflicting constraints causing a specific independent violation. The essential constraint(s) are one or more constraints capable of causing a particular independent violation. In this manner, one or more constraints that relate to a specific independent violation are identified. At act 358, the essential constraint(s) in the essential constraint list is removed from the updated list of conflicting constraints. At act 360, it is determined whether there are any constraints remaining to be validated in the updated list of conflicting constraints. If there are no constraints in the updated list of conflicting constraints, then at act 362, constraints that are capable of causing a specific independent violation in the list of conflicting constraints are grouped into a logical group, and then, the process ends. If there are constraints in the updated list of conflicting constraints that may cause another independent violation, then the process 300 is routed to act 322. In act 322, if the size of the updated list of conflicting constraints is less than the size of the list of conflicting constraints and if the validation is successful, then at act 330, the essential constraints are removed from the list of constraints obtained at act 304.

In the above-described manner, logical groups are formed through iterative process of identifying essential constraints from the list of constraints pre-defined for the product. Each logical group contains at least one constraint that is capable of causing a specific independent violation. The above process accurately identifies true violations and excludes false positive violations by identifying essential constraints. Logical grouping of constraints helps in quickly identifying which of the constraints are conflicting with the input expression and are capable of causing independent violations, thereby significantly saving time and effort.

FIG. 4 is a process flowchart 400 illustrating an exemplary method of computing solutions to resolve conflicts between constraints and requirement data associated with the product, according to an embodiment. Once the PDM system 100 groups conflicting constraints into a plurality of logical groups, the PDM system 100 computes solutions to resolve the conflicts between the constraints in the set of constraints and the requirement data in the form of an input expression. The solution may indicate that the conflict may be resolved by changing the constraint value or by changing values in the input expression. Particularly, the exemplary method described below illustrates computing solutions to resolve conflicts by modifying values of the input expression.

At act 402, a logical group of conflicting constraint(s) capable of causing a specific type of violation is selected for computing a solution to resolve conflict. For example, the logical group with least number of violations is selected. At act 404, one or more families among families appearing in the input expression are locked. A family is a group of mutually exclusive values, where selection of a value in the group to form the input expression would reset other available values. For a product 'car', families may include 'Model type' family, 'Wheel type' family, 'Transmission type' family. For example, the 'Model type' family may include model type as ATS model, non-ATS model, etc. Similarly, the 'Wheel type' family may include wheel diameter of 18 inches, 19 inches, 20 inches, etc. The input expression contains values selected by the user for each of the families. In one embodiment, the families that are mandatory and have a value in the input expression that should not be altered are automatically locked by the PDM system 100. In another embodiment, the families with values in the input expression that should not be modified to resolve the conflict are selected by the user. Accordingly, the PDM system 100 locks the families selected by the user. Thus, the remaining families that are not locked by the PDM system 100 may be considered for computing solutions to resolve conflicts. The phrase 'locking of family' may be freezing the choice of values within the family such that the frozen values may not be changed in the input expression for resolving conflicts.

At act 406, a pseudo constraint that enforces the locked families is created. The pseudo constraint is temporarily added to a set of constraints pre-defined for the product for the purpose of resolving the conflict. The pseudo constraint is created to enforce the locked families and compute solutions considering the families that are not locked. At act 408, a family with a value that is not locked in the input expression is selected from the unlocked families. For example, the family with a value that is in conflict with one of the constraints in the logical group is selected. For example, if the 'wheel type' family is unlocked, and the value of the 'wheel type' family is in conflict with the constraint related to wheel type, then the 'wheel type' family is selected for computing solution to resolve conflict.

At act 410, values that do not correspond to the selected family are reset in the input expression. In other words, value that corresponds to the selected family in the input expression is considered for computing the solution. For example, the value that corresponds to 'wheel type' family is considered for computing the solution. At act 412, possible values for the selected family are obtained from the constraints belonging to the logical group and the pseudo constraint. For example, the values corresponding to the 'wheel type' family are obtained from the constraints belonging to the logical group and the pseudo constraint.

At act 414, it is determined whether the value of the selected family in the input expression is in conflict with any of the constraints in the logical group and the pseudo constraint. If the value in the input expression is in conflict, then at act 416, the solution is computed for the selected family based on the value of the conflicting constraint in the logical group and the pseudo constraint. The process 400 is then routed to act 418. For example, the value of the constraint related to wheel diameter would be the value of the selected family 'wheel type'. Therefore, the solution contains a suggestion to modify the value of 'wheel type' family in the input expression to the value of the constraint related to wheel diameter. The value of the input expression is modified based on the solution, thereby resolving the conflict between the requirement data and the constraints.

If, at act 414, it is determined that the value of the selected family is not in conflict, then at act 418, it is determined whether all families that are not locked are exhausted for computing solutions to resolve conflicts. If all families are not exhausted, then another family that is not locked is selected for computing solutions at act 408, and acts 410 and 418 are repeated. The process 400 repeats till all families are exhausted. If it is determined that all the families are exhausted, then at act 420, it is determined whether all the logical groups are exhausted. If some of the logical groups are remaining, then the process is routed to act 402, and the process 400 ends. Accordingly, the values in the input expression are modified based on the computed solutions to resolve the conflicts. Thereafter, the input expression is validated against the set of constraints pre-defined for the product. If the input expression is validated successfully, then the product may be configured based on the values in the input expression.

Figure 5:
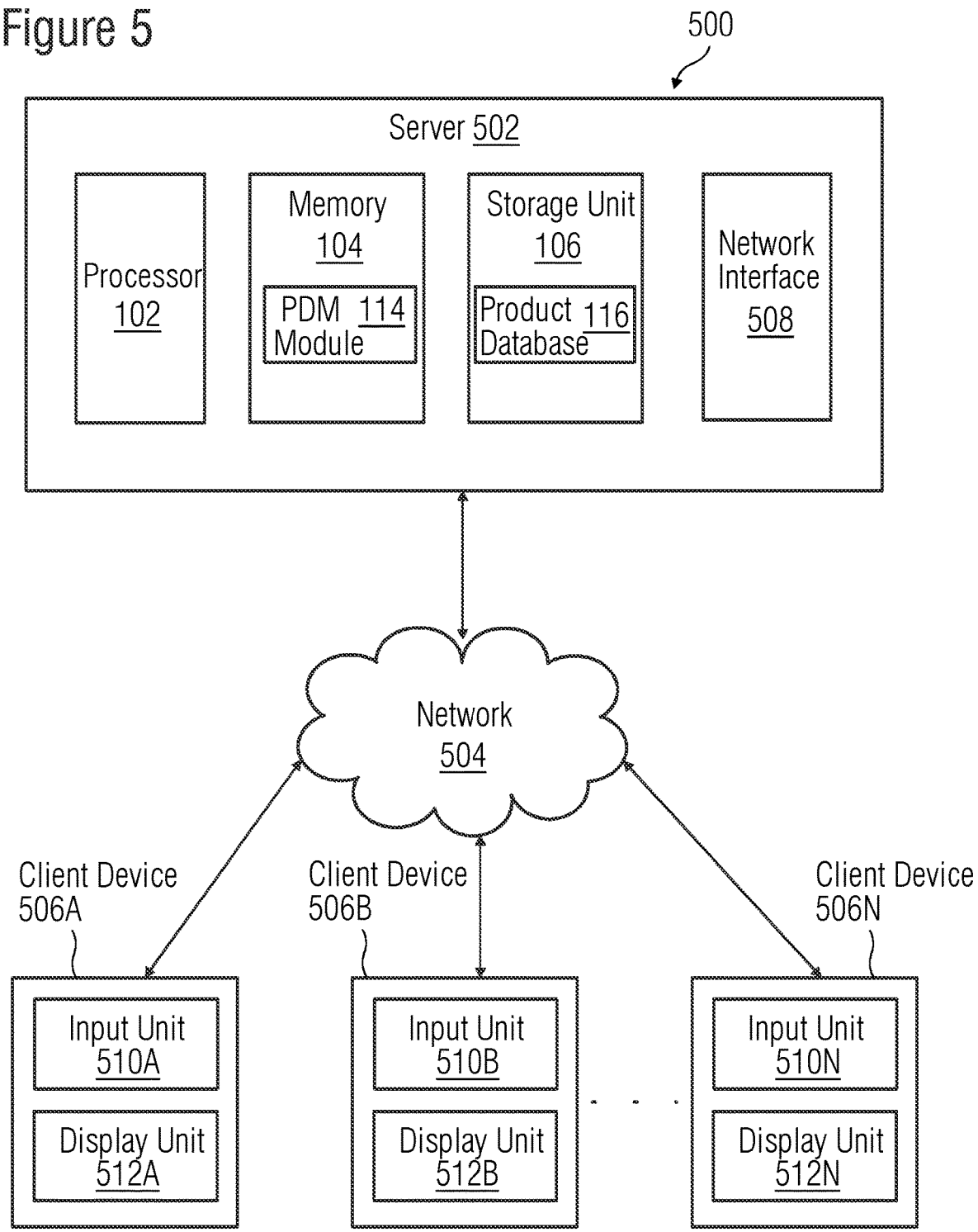
FIG. 5 illustrates a block diagram of another PDM system in which an embodiment may be implemented.

FIG. 5 illustrates a block diagram of a PDM system 500 in which an embodiment may be implemented. Particularly, the PDM system 500 includes a server 502 and a plurality of client devices 506A-N. Each of the client devices 506A-N is connected to the server 502 via a network 504 (e.g., Local Area Network (LAN), Wide Area Network (WAN), Wi-Fi, etc.). The PDM system 500 is another implementation of the PDM system 100 of FIG. 1, where the PDM module 114 resides in the server 502 and is accessed by client devices 506A-N via the network 504.

The server 502 includes the processor 102, the accessible memory 104, and the storage unit 106. The memory 104 includes the PDM module 114 stored in the form of machine-readable instructions executable by the processor 102. When executed by the processor 102, the PDM module 114 causes the processor 102 to group constraints pre-defined for a product that are in conflict with requirement data into a plurality of logical groups corresponding to violations, compute solutions to resolve conflicts, and automatically resolve the conflicts between the constraints and the requirement data. Method acts performed by the processor 102 to achieve the above-mentioned functionality are described in greater detail in FIGS. 2 to 4. The storage medium 106 may be a non-transitory storage medium that stores the product database 116. The product database 116 stores a set of constraints pre-defined for a product. The product data 116 also stores information of the product (e.g., geometric model information). The processor 102, the memory 104, and the storage unit 106 may be interconnected via a bus (not shown). Additionally, the server 502 includes a network interface 508 for communicating with the client devices 506A-N via the network 504.

The client devices 506A-N are provided with input units 510A-N and display units 512A-N, respectively. Users of the client devices 506A-N may access the server 502 via a graphical user interface displayed on the respective display units 512A-N. The graphic user interfaces may be specifically designed for accessing the PDM module 114 in the server 502.

In an exemplary operation, a user of the client device 506A may send a request to the server 502 to configure a product (e.g., a car) via a graphical user interface. The server 502 may prompt the user to provide requirement data associated with the product on the graphical user interface. Accordingly, the user may input the requirement data of the product in the form of input expression via the graphical user interface. The client device 406A sends the requirement data to the server 502 via the network 504. Accordingly, the processor 102 in the server 502 validates a set of constraints pre-defined for the product based on the requirement data and identifies conflicts between one or more constraints and the requirement data. The processor 102 determines different independent violations that may be caused by the constraints that are in conflict with the requirement data and groups the constraints into one or more logical groups based on different independent violations. The logical group may include at least one constraint associated with a specific independent violation. Then, the processor 102 outputs a multi-dimensional representation of violations on the display unit 512A of the client device 506A. For example, the graphical user interface may display total number of logical groups capable of causing violations, and constraints belonging to each of the logical groups. Also, the processor 102 may compute one or more solutions that may resolve the conflicts between the constraints and the requirement data and present the one or more solutions to the user of the client device 506A on the display unit 512A. Each solution may indicate reasons for a particular conflict and actions required for resolving the conflicts between the constraints and the requirement data. For example, the solution may indicate that conflict arises because the certain requirement data do not match with the constraint, and the requirement data is to be modified to a specific value to resolve the conflict.

In one embodiment, the graphical user interface enables the user to visualize the solutions for resolving the conflicts and allows the user to select a relevant solution from the solutions computed by the processor 102 to avoid violations in the product. Based on the selection, the processor 102 applies the solution to the resolve the conflicts and avoid violations. In another embodiment, the processor 102 is configured to automatically resolve the conflicts. In this embodiment, the processor 102 automatically resolves each of the conflicts based on the computed solutions. In yet another embodiment, the processor 102 may allow the user to input modifications to the requirement data (e.g., errors in the requirement data) or the conflicting constraints. The processor 102 may validate the user inputs for modifying the requirement data and/or the conflicting constraints by determining whether the modified requirement data and/or the constraints would resolve the conflicts and provide feedback to the user based on the outcome of validation. If the validation is successful, then the processor 102 modifies the requirement data or the conflicting constraints, thereby resolving conflicts and avoiding violations related to the product.

Once the conflicts are resolved, the processor 102 may configure the product based on the requirement data and output configured product information on the graphical user interface of the client device 506A. Also, the processor 102 may store information associated with the configured product in the product database 116.

In the PDM system 500, a plurality of users may simultaneously validate the requirement data against the set of constraints by accessing the server 502 from the client devices 506A-N. This eliminates the need for installing the PDM module 114 on each of the client devices 506A-N. In accordance with the foregoing description, the PDM system 500 may be implemented in a cloud computing environment, where the PDM module 114 is hosted on a cloud server.

Figure 6A:
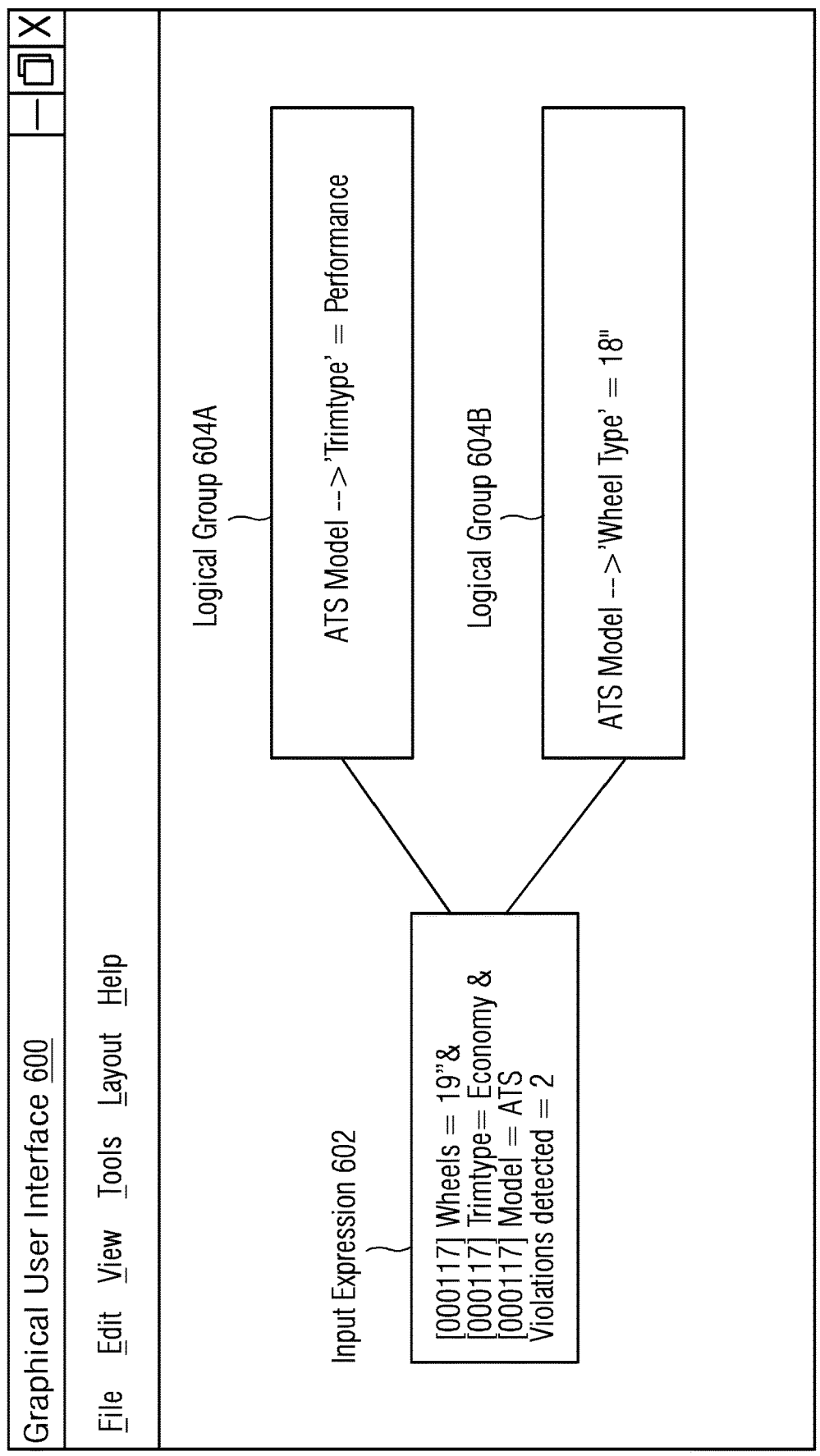
FIGS. 6A-6D are screenshot views of a graphical user interface of the PDM systems depicting a process of resolving conflicts between constraints and requirement data based on solutions, according to an embodiment.

FIGS. 6A-6D are screenshot views of a graphical user interface 600 of the PDM systems 100 and 500 depicting a process of resolving conflict between constraints and requirement data based on solutions, according to an embodiment. For the purpose of illustration, consider that a vehicle model 'ATS' is to be configured in a PDM system (e.g., PDM system 100). Also, consider that the following constraints are pre-defined for the vehicle model 'ATS':
Constraint 1: Model=ATS implies Trimtype=Performance
Constraint 2: Trimtype=Performance implies Transmission=Manual
Constraint 3: Model=ATS implies Wheel=18 inches Consider that a user wishes to configure the Vehicle Model 'ATS', Trimtype 'Economy', and Wheel diameter 19 inches. The user creates an input expression by selecting values corresponding to 'Model type' Family as 'ATS', 'Trimtype' family as 'Economy', and 'Wheel type' family as '19 inches'. The input expression 602 created by the user is illustrated in the screenshot view of FIG. 6A. Based on the input expression 602, the PDM system 100 obtains the set of constraints (e.g., constraint 1, constraint 2 and constraint 3) for the vehicle model 'ATS' from the product database 116 to configure the vehicle model 'ATS'. Prior to configuring the model 'ATS', the PDM system 100 identifies that the constraint 1 and the constraint 3 are in conflict with the input expression 602. The PDM system 100 also determines that violations caused by the conflicting constraints are with respect to trimtype and wheel type. Hence, the PDM system 100 groups the constraint 1 and the constraint 2 into a logical group 604A, as the logical group 604A is capable of causing a specific independent violation related to trimtype. Similarly, the PDM system 100 groups the constraint 3 in a logical group 604B, as the logical group 604B is capable of causing a specific independent violation related to wheel type. Accordingly, the PDM system 100 outputs the logical groups 604A and 604B of conflicting constraints on the graphical user interface 600, as illustrated in FIG. 6A.

Figure 6B:
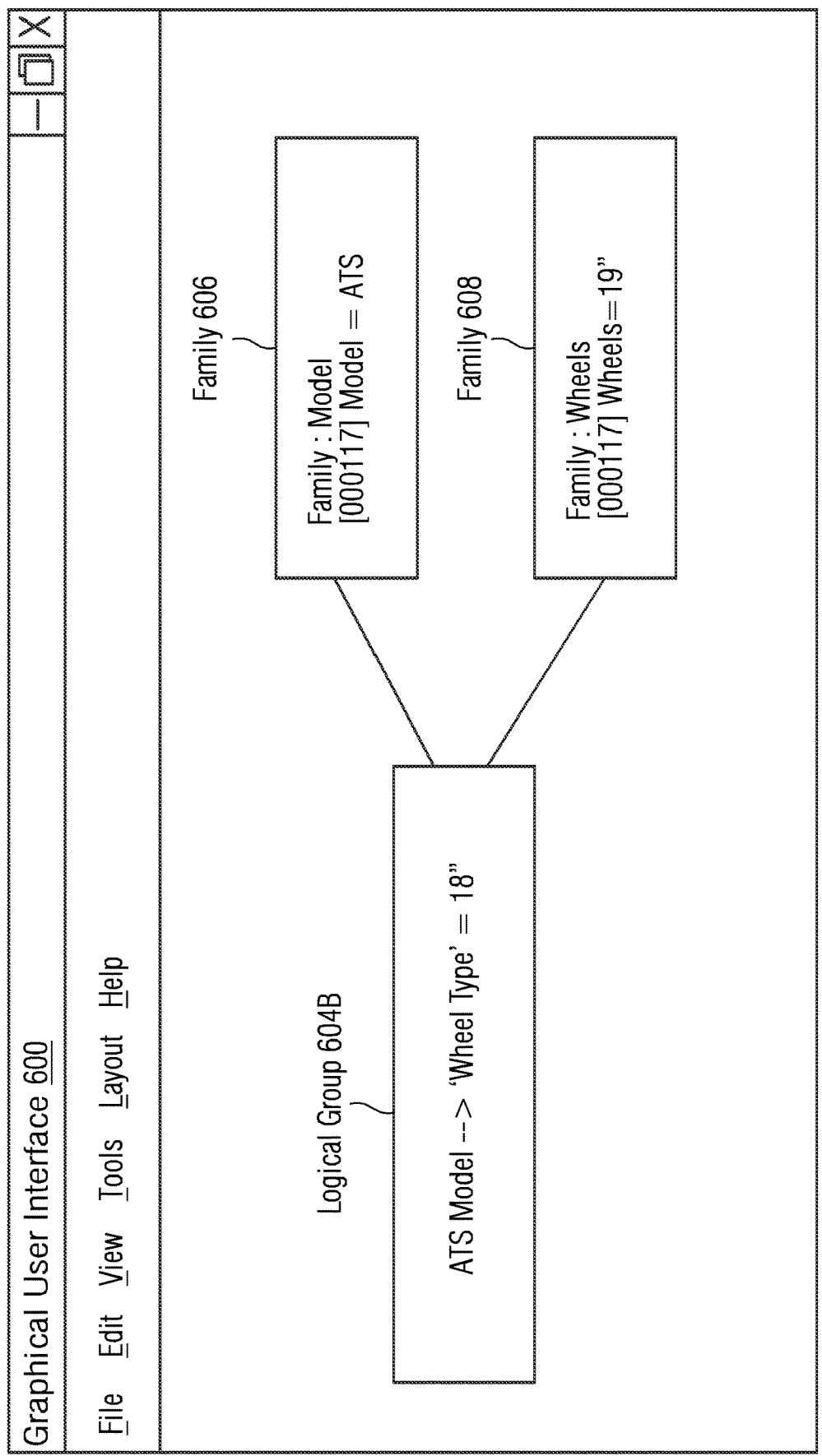
Figure 6C:
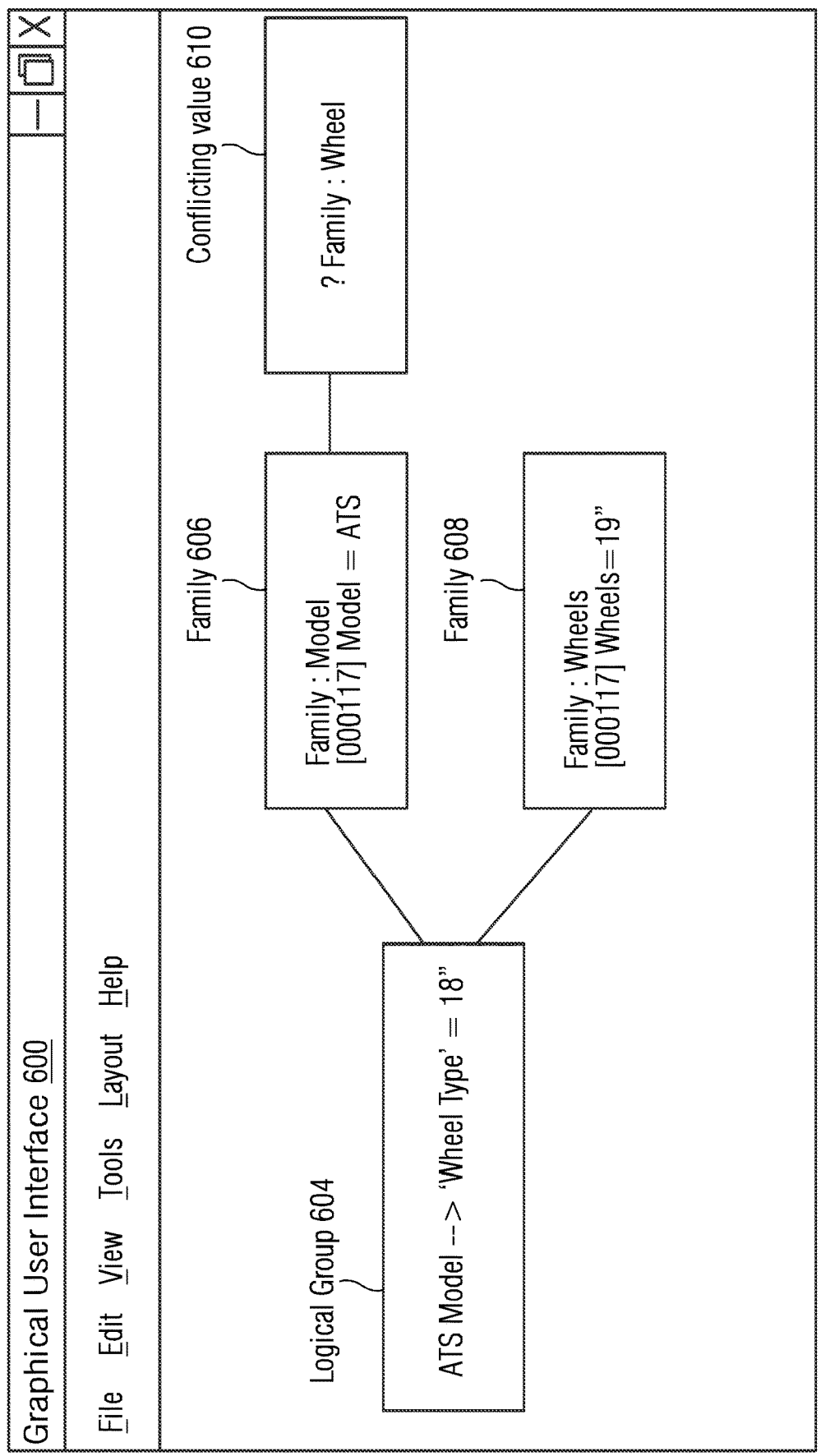

Consider that the PDM system 100 selects the logical group 604B for computing solutions to resolve conflicts. The PDM system 100 identifies families associated with the values in the input expression 602 that are in conflict with the constraint 3 in the logical group 604B. As shown in FIG. 6B, the PDM system 100 displays a 'model type' family 606 and a 'wheel type' family 608 associated with the values in the input expression 602 on the graphical user interface 600. In an exemplary implementation, the PDM system 100 displays the family 606 and the family 608 when the user clicks on the logical group 604B displayed on the graphical user interface 600.

Prior to computing a solution to resolve conflict, the PDM system 100 may automatically lock one of the families 606 and 608. Alternatively, the user may select one of the families 606 and 608 for locking via the graphical user interface 600. Accordingly, the PDM system 100 may lock the family selected by the user. For the purpose of illustration, consider that the PDM system 100 locks the family 606. Locking of the family 606 results in freezing the value 'Model=ATS'. Hence, the family 606 is not considered for computing the solution to resolve conflict. Consider that the family 608 is not locked. Hence, the value of the 'wheel type' family 608 in the input expression 602 may be considered for computing the solution to resolve conflict. The PDM system 100 creates a pseudo constraint that enforces the locked family 606 and adds the pseudo constraint to a list of constraints. Consider that for the pseudo constraint as constraint 4, Model=ATS. The list of constraint contains the constraint 3 and the constraint 4. Thereafter, the PDM system 100 selects the family 608 for computing the solution. The PDM system 100 resets values in the input expression 602 for families other than the family 608. Thus, the input expression 602 contains value of 'wheel type' family=19 inches. The PDM system 100 determines whether the value (e.g., wheel=19 inches) in the input expression 602 is in conflict with the constraint 3 and the constraint 4 (e.g., pseudo constraint). The PDM system 100 determines that the value in the input expression 602 is in conflict with the modified input expression 100. As shown in the graphical user interface 600 of FIG. 6C, the value 610 of the family 'wheel type' 608 in the input expression 602 is in conflict with the constraint 3 and the constraint 4.

Figure 6D:
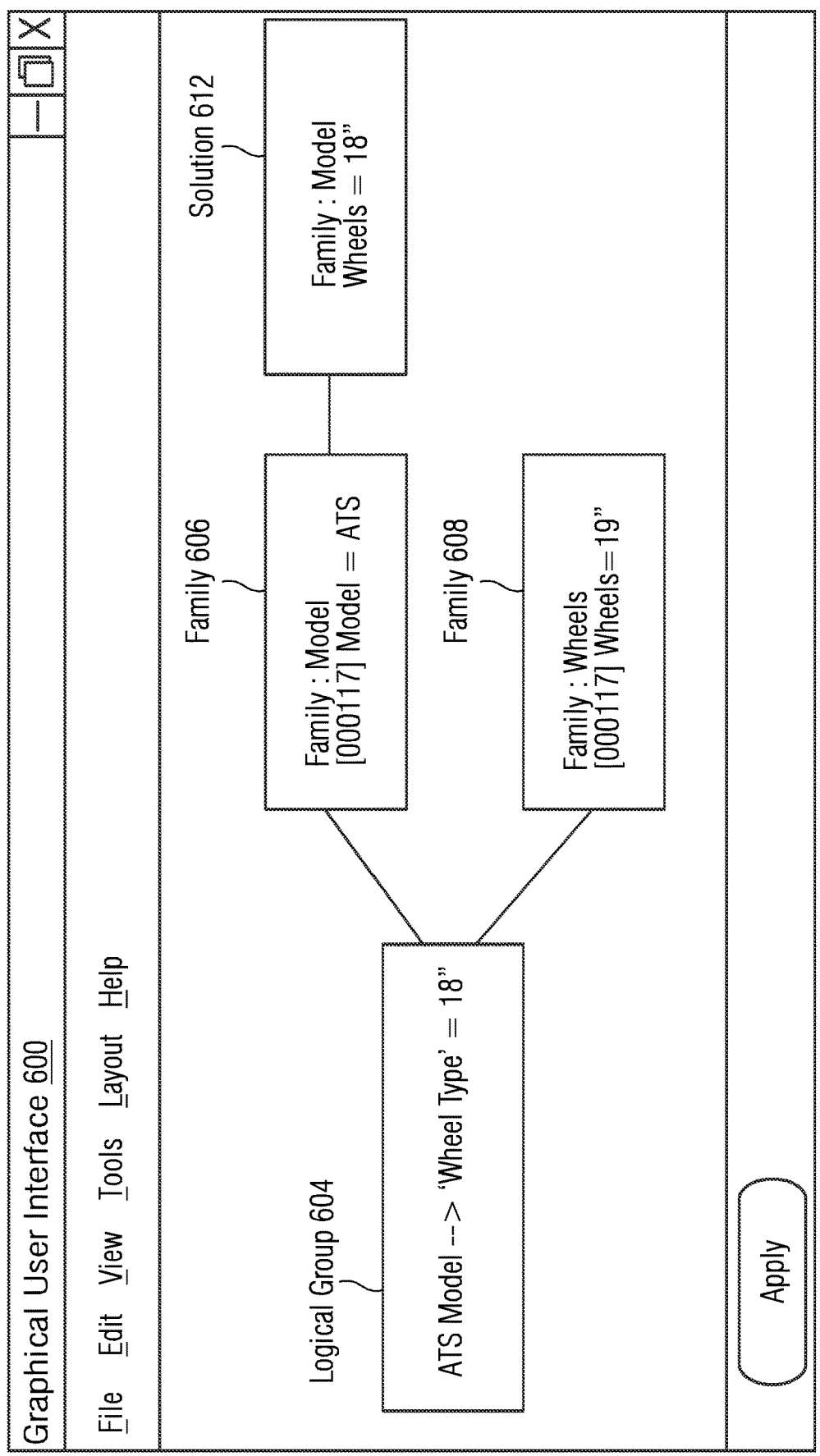

The PDM system 100 computes a solution to resolve the conflict between the value 610 of the 'wheel type' family 608 and the constraints. For example, the PDM system 100 resets the value of the family 608 from the original input expression 602 and adds a pseudo constraint containing all values including the conflicting value of the family 608. The reset input expression 602 and constraints are given below:
Input Expression:
ATS Model & Manual Transmission
Constraints:
ATS Model enforces Wheel type=18 inches
Model=ATS
Wheel type=18 inches or Wheel type=19 inches The PDM system 100 validates the reset input expression 602 against the constraints. The PDM system 100 determines the reset input expression 602 is valid if the input expression 602 contains Model=ATS and Wheel type=18 inches. Consequently, the PDM system 100 generates a solution that suggests that the input expression 602 is to be modified to change the value of the 'wheel type' family 608 to 18 inches instead of 19 inches. As depicted in FIG. 6D, the graphical user interface 600 displays the solution 612 that suggests that the value of the 'wheel type' family 608 should be equal to 18 inches to resolve conflict. The PDM system 100 resolves the conflict by modifying the input expression 602 to include the value of the 'wheel type' family=18 inches. In the similar manner, the conflict between constraints in the logical group 604A and the input expression 602 may be resolved. The PDM system 100 may author a variant condition on a Bill of Material (BOM) line in a product assembly using the modified values in the input expression.

In various embodiments, the PDM systems 100 and 500 described in FIGS. 1 to 6D manage conflict-based violations through resolving conflicts between constraints and requirement data associated with a product. This is achieved by categorizing the constraints based on different independent violations and grouping the constraints into logical groups based on the different independent violations. Also, the PDM systems 100 and 500 facilitate the user to visualize a multi-dimensional representation of independent violations caused by the conflicting constraints. The PDM systems 100 and 500 compute solutions to resolve the conflicts between the constraints and the requirement data and automatically resolve conflicts between the constraints and the requirement data based on the one or more solutions. Additionally, the PDM systems 100 and 500 do not include constraints capable of causing false positive violations in the logical groups or omit constraints capable of causing true violations from the logical groups. Thus, the PDM systems 100 and 500 accurately identify constraints responsible for independent violations and categorize the constraints into logical groups based on the independent violations.

Those skilled in the art will recognize that, unless specifically indicated or required by the sequence of operations, certain acts in the processes described above may be omitted, performed concurrently or sequentially, or performed in a different order.

Those skilled in the art will recognize that, for simplicity and clarity, the full structure and operation of all Product Data Management (PDM) systems suitable for use with the present disclosure is not being depicted or described herein. Instead, only so much of a PDM system as is unique to the present disclosure or necessary for an understanding of the present disclosure is depicted and described. The remainder of the construction and operation of the PDM system 100 may conform to any of the various current implementation and practices known in the art.

The system and methods described herein may be implemented in various forms of hardware, software, firmware, special purpose processors, or a combination thereof. One or more of the present embodiments may take a form of a computer program product including program modules accessible from a computer-usable or computer-readable medium storing program code for use by or in connection with one or more computers, processors, or instruction execution system. For the purpose of this description, a computer-usable or computer-readable medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device). Propagation mediums in and of themselves as signal carriers are not included in the definition of physical computer-readable medium. The medium may include a semiconductor or solid-state memory, magnetic tape, a removable computer diskette, random access memory (RAM), a read only memory (ROM), a rigid magnetic disk and optical disk such as compact disk read-only memory (CD-ROM), compact disk read/write, and digital versatile disc (DVD). Both processors and program code for implementing each aspect of the technology may be centralized or distributed (or a combination thereof) as known to those skilled in the art.

While the present disclosure has been described in detail with reference to certain embodiments, the present disclosure is not limited to those embodiments. In view of the present disclosure, many modifications and variations would present themselves to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope.

The invention claimed is:

1. A method of managing constraint-based violations associated with a product in a computer-implemented Product Data Management (PDM) system, the method comprising:

obtaining, using the computer-implemented PDM system, a set of constraints defined for the product from a product database, the set of constraints comprising one or more families with corresponding values, each family of the one or more families representing a single type of product design option and comprising a group of mutually exclusive values associated with the single type of product design option, wherein each constraint of the set of constraints is associated with a single family and a single corresponding value;

obtaining, by a processor of the computer-implemented PDM system, requirement data associated with the product, the requirement data being in the form of an input expression via a graphical user interface of the computer-implemented PDM system, the input expression containing one or more values associated with or more families of the set of constraints;

determining, by the processor of the computer-implemented PDM system, constraints from the set of constraints that are conflicting with the obtained requirement data associated with the product when the requirement data is not successfully validated with respect to the set of constraints, wherein a constraint is conflicting when a value of the input expression associated with the single family of the constraint does not match the single corresponding value of the constraint, and wherein at least one constraint from the set of constraints is responsible for causing a violation;

grouping, by the processor of the computer-implemented PDM system, the conflicting constraints into a plurality of logical groups based on a type of independent violation, the type of independent violation indicating a specific conflict between a value of a family of a single constraint and a value of a corresponding family of the requirement data for a type of family, wherein each logical group of the plurality of logical groups is associated with a single independent violation, such that the independent violation of a respective logical group represents a single conflict between a value of a family of the obtained requirement data and a value of a corresponding family of the constraint of the respective logical group;

outputting a multi-dimensional representation of the plurality of logical groups of conflicting constraints on a first view of the graphical user interface of the computer-implemented PDM system, such that a total number of independent violations for the obtained requirement data is determinable by a user from the first vie;

computing, by the processor of the computer-implemented PDM system, one or more solutions corresponding to each independent violation based on the logical groups;

automatically resolving conflicts between the constraints and requirement data corresponding to respective independent violations based on the corresponding one or more solutions; and configuring the product based on the requirement data upon resolving the conflicts.

2. The method of claim 1, wherein the multi-dimensional representation of the plurality of logical groups of conflicting constraints comprises a total number of logical groups capable of causing independent violations, and constraints belonging to each of the logical groups.

3. The method of claim 1, wherein determining the constraints from the set of constraints that are conflicting with the requirement data associated with the product further comprises:

validating the requirement data with respect to the set of constraints pre-defined for the product;

determining whether the requirement data is successfully validated with respect to the set of constraints; and when the requirement data is successfully validated, configuring the product based on the requirement data.

4. The method of claim 3, wherein grouping the constraints into the plurality of logical groups comprises:

determining different independent violations based on the identified constraints; and grouping the constraints into the plurality of logical groups based on the different independent violations.

5. A computer-implemented Product Data Management (PDM) system comprising:

a processor; and an accessible memory coupled to the processor, wherein the memory comprises a PDM module configured to:

obtain a set of constraints defined for a product, the set of constraints comprising one or more families with corresponding values, each family of the one or more families representing a single type of product design option and comprising a group of mutually exclusive values associated with the single type of product design option, wherein each constraint of the set of constraints is associated with a single family and single corresponding value;

obtain requirement data associated with the product, the requirement data being in the form of an input expression via a graphical user interface of the computer-implemented PDM system, the input expression containing one or more values associated with one or more families of the set of constraints;

determine constraints that are conflicting with the obtained requirement data associated with the product from the set of constraints when the requirement data is not successfully validated with respect to the set of constraints, wherein a constraint is conflicting when a value of the input expression associated with the single family of the constraint does not match the single corresponding value of the constraint, and wherein at least one constraint from the set of constraints is responsible for causing a violation;

group the conflicting constraints into a plurality of logical groups based on a type of independent violation, the type of independent violation indicating a specific conflict between a value of a family of a single constraint and a value of a corresponding family of the requirement data for a type of family, each logical group of the plurality of logical groups being associated with a single independent violation, such that the independent violation of a respective logical group represents a single conflict between a value of a family of the obtained requirement data and a value of a corresponding family of the constraint of the respective logical group;

output a multi-dimensional representation of the plurality of logical groups of conflicting constraints on a first view of a display unit, such that a total number of independent violations is determinable by a user from the first view;

compute one or more solutions corresponding to each independent violation based on the logical groups;

automatically resolve conflicts between the constraints and requirement data corresponding to respective independent violations based on the corresponding one or more solutions; and configure the product based on the requirement data upon resolving the conflicts.

6. The computer-implemented PDM system of claim 5, wherein the multi-dimensional representation of the plurality of logical groups of conflicting constraints comprises a total number of logical groups capable of causing independent violations, and constraints belonging to each of the logical groups.

7. The computer-implemented PDM system of claim 5, wherein the determination of the constraints from the set of constraints that are conflicting with the requirement data associated with the product further comprises:
validation of the requirement data with respect to the set of constraints pre-defined for the product;
determination of whether the requirement data is successfully validated with respect to the set of constraints; and
when the requirement data is successfully validated, configuration of the product based on the requirement data.

8. The computer-implemented PDM system of claim 7, wherein to group the conflicting constraints into the plurality of logical groups, the PDM module is further configured to:
determine different independent violations based on the identified constraints; and
group the conflicting constraints into the plurality of logical groups based on the different independent violations.

9. A non-transitory computer-readable storage medium that stores instructions executable by a Product Data Management (PDM) system to manage constraint-based violations associated with a product in the PDM system, the instructions comprising:
obtaining a set of constraints defined for a product from a product database, the set of constraints comprising one or more families with corresponding values, each family of the one or more families representing a single type of product design option and comprising a group of mutually exclusive values associated with the single type of product design option, wherein each constraint of the set of constraints is associated with a single family and single corresponding value;

determining constraints that are conflicting with requirement data associated with the product from the set of constraints when the requirement data is not successfully validated with respect to the set of constraints, the requirement data being in the form of an input expression via a graphical user interface of the computer-implemented PDM system, the input expression containing one or more values associated with the one or more families of the set of constraints, wherein a constraint is conflicting when a value of the input expression associated with the single family of the constraint does not match the single corresponding value of the constraint, and wherein at least one constraint from the set of constraints is responsible for causing a violation;

grouping the conflicting constraints into a plurality of logical groups based on a type of independent violation, the type of independent violation indicating a specific conflict between a value of a family of a single constraint and a value of a corresponding family of the requirement data for a type of family, each logical group of the plurality of logical groups being associated with a single independent violation, such that the independent violation of a respective logical group represents a single conflict between a value of a family of the requirement data and a value of a corresponding family of the constraint of the respective logical group;

outputting a multi-dimensional representation of the plurality of logical groups of conflicting constraints on a first view of a display unit of the PDM system, such that a total number of independent violations is determinable by a user from the first view;

computing one or more solutions corresponding to each independent violation based on the logical groups;

automatically resolving conflicts between the constraints and requirement data corresponding to respective independent violations based on the corresponding one or more solutions; and configuring the product based on the requirement data upon resolving the conflicts.

10. The non-transitory computer-readable storage medium of claim 9, wherein the multi-dimensional representation of the plurality of logical groups of conflicting constraints comprises a total number of logical groups capable of causing the independent violations and constraints belonging to each of the logical groups.

11. The non-transitory computer-readable storage medium of claim 9, wherein the determining of the constraints from the set of constraints that conflicts with the requirement data associated with the product comprises:
validating the requirement data with respect to the set of constraints pre-defined for the product;
determining whether the requirement data is successfully validated with respect to the set of constraints; and
when the requirement data is successfully validated, configuring the product based on the requirement data.

12. The non-transitory computer-readable storage medium of claim 9, wherein the grouping of the conflicting constraints into the plurality of logical groups comprises:
determining different independent violations based on the identified constraints; and
grouping the conflicting constraints into the plurality of logical groups based on the different independent violations.

13. The method of claim 1, further comprising:
locking a value for a corresponding family of a logical group of the plurality of logical groups, such that the corresponding family of the locked value is not considered for computing one or more solutions corresponding to each independent violation;
creating a pseudo constraint based on the locked value; and
adding the pseudo constraint to the set of constraints.

* * * * *

UNITED STATES PATENT AND TRADEMARK OFFICE
CERTIFICATE OF CORRECTION

PATENT NO. : 11,113,737 B2
APPLICATION NO. : 15/265957
DATED : September 7, 2021
INVENTOR(S) : Thomas Moeller et al.

It is certified that error appears in the above-identified patent and that said Letters Patent is hereby corrected as shown below:

In the Claims

Column 15, Line 44:
"containing one or more values associated with or"
Should be replaced with:
"containing one or more values associated with the one or"

Column 16, Line 9:
"data is determinable by a user from the first vie;"
Should be replaced with:
"data is determinable by a user from the first view;"

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*